R. A. KELLY.
NUT-LOCKS.

No. 195,513. Patented Sept. 25, 1877.

Attest.

Inventor.

Richard A. Kelly.

UNITED STATES PATENT OFFICE.

RICHARD A. KELLY, OF MANCHESTER, IOWA.

IMPROVEMENT IN NUT-LOCKS.

Specification forming part of Letters Patent No. 195,513, dated September 25, 1877; application filed March 6, 1877.

*To all whom it may concern:*

Be it known that I, RICHARD A. KELLY, of Manchester, county of Delaware and State of Iowa, have invented a new and Improved Nut-Lock; and I do hereby declare that the following is a full, clear, and exact description of the same.

The invention is an improvement in that class of nut-locks particularly adapted to use on fish-plate rails; and consists of a long washer secured at one end to one of the bolts and bent up against its nut, while the other end is left free, and is arranged to rest against the nut on the other bolt.

Figure 1:
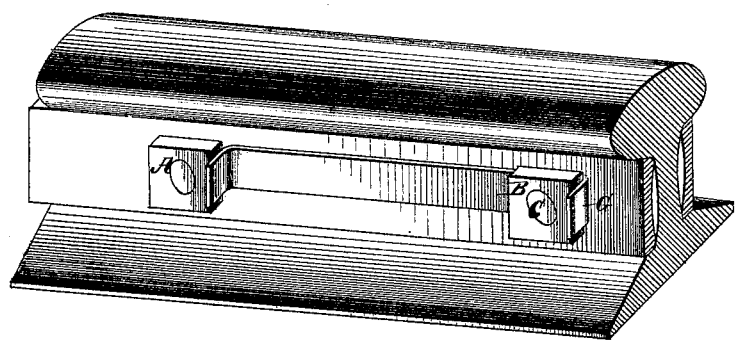
Figure 2:
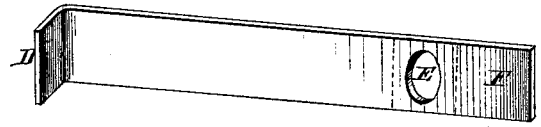

Figure 1 shows both nuts on a fish-plate rail locked. Fig. 2 shows the washer ready to use.

It is made of a piece of metal of width and thickness proportioned to the size of the nut, with a hole, E, at such a distance from the end of the washer that the end F of said washer will project beyond the nut represented by the space within the dotted lines.

From the center of the hole F I measure off a distance on the washer equal to that from the center of the bolt C, Fig. 1, to the nearest side of nut A, and turn up the balance of said washer, as represented by D, Fig. 2.

To apply it I screw up nut A to the position shown in Fig. 1. Then I place the end D of the washer against the side of nut A nearest to bolt C. Then bolt C will pass through the hole E of the washer. Now, screw up nut B, as shown in Fig. 1. Then turn up the end F, Fig. 2, as at G, Fig. 1, and both nuts are locked.

What I claim is—

A lock for the nuts on two independent bolts, consisting of a long washer, one end of which is secured to one bolt and bent up against its nut, and the other bent end of which rests against the nut on the other bolt, but is left entirely free from and unsecured by either said bolt or nut, substantially as described.

The above specification of my invention signed by me this 2d day of March, 1877.

RICHARD A. KELLY.

Witnesses:
J. L. KELSEY,
C. A. DUDLEY.